(12) United States Patent
Lee

(10) Patent No.: US 7,070,295 B1
(45) Date of Patent: Jul. 4, 2006

(54) LIGHT DEVICE FOR ATTACHING TO OBJECTS

(76) Inventor: Wen Sung Lee, 8F2, No. 60-2, Gong Yeh Chu 1st Road, Taichung 40767 (TW)

( * ) Notice: Subject to any disclaimer, the term of this patent is extended or adjusted under 35 U.S.C. 154(b) by 0 days.

(21) Appl. No.: 11/250,840

(22) Filed: Oct. 14, 2005

(51) Int. Cl.
*F21L 4/00* (2006.01)
(52) U.S. Cl. .................. 362/191; 362/474; 362/396
(58) Field of Classification Search ............... 362/474, 362/191; 24/271, 272, 33 V, 318
See application file for complete search history.

(56) References Cited

U.S. PATENT DOCUMENTS

| | | | |
|---|---|---|---|
| 3,894,281 A | 7/1975 | Bloomfield | 322/1 |
| 4,597,031 A * | 6/1986 | Tsuyama | 362/476 |
| 5,378,553 A * | 1/1995 | Shoji | 429/97 |
| 5,690,410 A | 11/1997 | Lin | 362/72 |
| 6,802,109 B1 * | 10/2004 | Hede et al. | 24/318 |
| 6,837,599 B1 * | 1/2005 | Liaw et al. | 362/473 |
| 6,868,587 B1 * | 3/2005 | Rard | 24/170 |

* cited by examiner

*Primary Examiner*—Ali Alavi
*Assistant Examiner*—Zahra I. Bennett
(74) *Attorney, Agent, or Firm*—Charles E. Baxley

(57) ABSTRACT

A light device includes an attaching device for attaching onto a supporting object or a bicycle, and a light member selectively attached to the attaching device for being used as a light facility for the bicycle, and selectively disengaged from the supporting object for being used as a flashlight device. The attaching device includes an arm having a channel to receive an anchoring device which is attached to the light member, and a fastener strap engaged with the arm, for detachably attaching the arm of the attaching device onto the bicycle. The arm includes a spring-biased catch to engage with and to retain the anchoring member to the arm, and includes a pad for softly engaging with the bicycle.

16 Claims, 13 Drawing Sheets

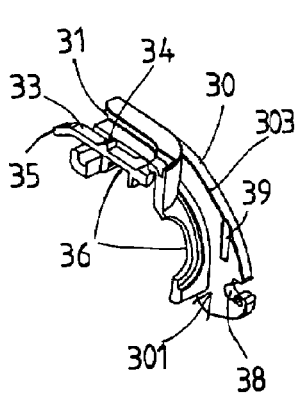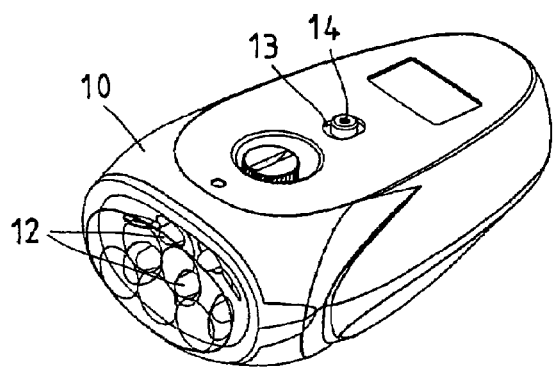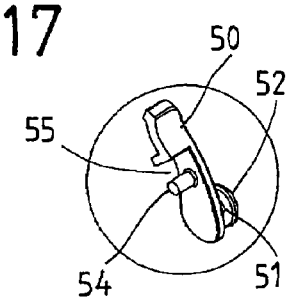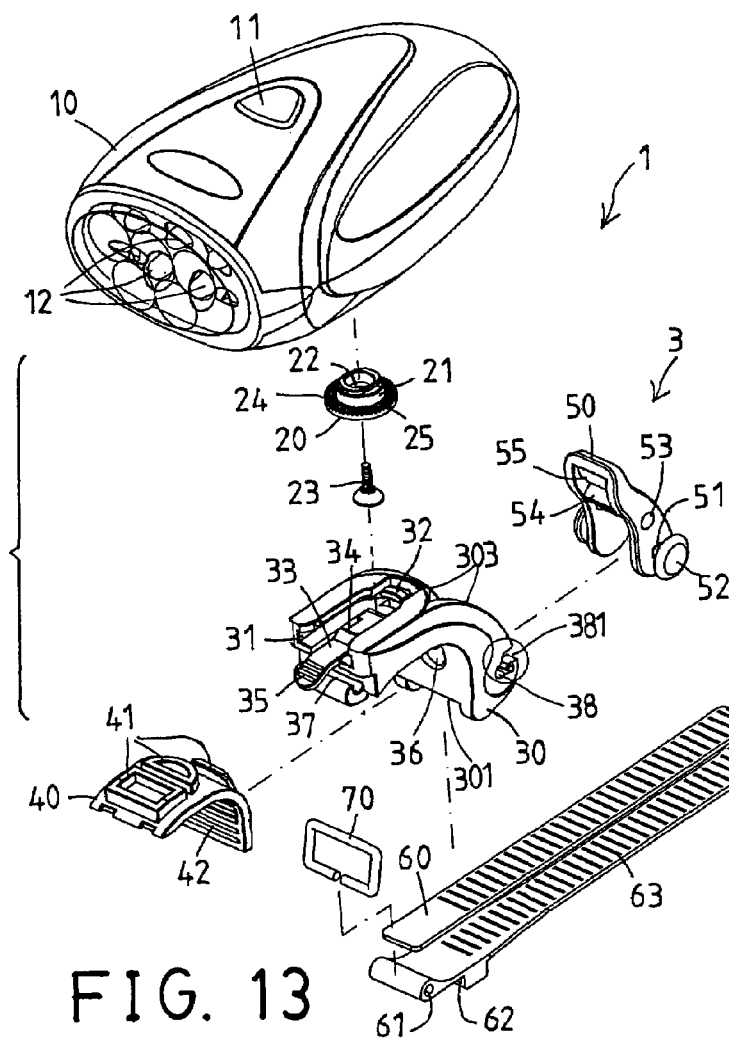
FIG. 14
FIG. 17
FIG. 16
FIG. 15
FIG. 13

LIGHT DEVICE FOR ATTACHING TO OBJECTS

BACKGROUND OF THE INVENTION

1. Field of the Invention

The present invention relates to a light device, and more particularly to a light device having a structure for easily and readily attaching to various objects, such as bicycles, etc. when required, and for allowing the light device to be disengaged or detached from the objects or from the bicycle, and to be used as a separated flashlight.

2. Description of the Prior Art

Typical bicycles may comprise one or more light devices attached to the front portion and/or the rear portion and/or the side portions thereof, for generating lights, and may comprise an electric energy generating device attached thereto and coupled to the light devices, for generating electric energy to actuate or to energize the light devices, particularly when the bicycle is ridden or operated by the user.

For example, U.S. Pat. No. 3,894,281 to Bloomfield discloses one of the typical battery and generator vehicle lighting systems comprising an electric energy generating means and a battery means for providing constant lighting whether the vehicle is moving or halted, and a light member coupled to the electric energy generating means and the battery means, for being energized or actuated to generate light.

However, normally, the light member is solidly attached or secured onto the bicycle and may not be removed or disengaged from the bicycle, such that the light member may not be used as a separated flashlight.

U.S. Pat. No. 5,690,410 to Lin discloses another typical light device for attaching or securing onto a bicycle and comprising a magnetic sensor and an inducing block movable relative to each other for generating electric energy to energize or actuate the light device.

However, similarly, the light device is attached or secured onto the bicycle with a clamping device and may not be removed or disengaged from the bicycle, such that the light member also may not be used as a separated flashlight.

The present invention has arisen to mitigate and/or obviate the afore-described disadvantages of the conventional light devices for bicycles.

SUMMARY OF THE INVENTION

The primary objective of the present invention is to provide a light device including a structure for easily and readily attaching to various objects, such as bicycles, etc. when required, and for allowing the light device to be disengaged or detached from the bicycle, and to be used as a separated flashlight, when required.

In accordance with one aspect of the invention, there is provided a light device comprising an attaching device for attaching onto a supporting object, such as a bicycle, and a light member for being selectively attached to the attaching device, and for being selectively used as a light facility for the supporting object, and selectively disengaged from the supporting object for being used as a flashlight device.

The attaching device includes an arm having a channel formed therein, an anchoring device is further provided for selectively anchoring the light member to the supporting object with the attaching device, and includes an anchoring member having a flap extended therefrom, for engaging into the channel of the arm, and for detachably attaching to the arm of the attaching device. The arm includes a tongue extended into the channel thereof, for engaging with and for retaining the flap of the anchoring member in the channel of the arm.

The arm includes a spring-biased catch extended into the channel thereof, for engaging with and for retaining the flap of the anchoring member in the channel of the arm. The arm includes a spring blade having the catch extended therefrom and extended into the channel thereof, and having a hand grip for being depressed or actuated by the user, and for selectively disengaging the catch from the anchoring member.

The light member includes a cavity formed therein, and the anchoring member includes a protrusion extended therefrom for engaging into the cavity of the light member, and for securing to the light member. The cavity of the light member includes a non-circular cross section, and the protrusion of the anchoring member includes a non-circular cross section for engaging the non-circular cavity of the light member, and thus for preventing the anchoring member from being rotated or moved relative to the light member.

The light member includes a stud extended in the cavity thereof, and the anchoring member includes a bore formed therein for receiving the stud of the light member, and for securing the anchoring member to the light member with such as a fastener which may be threaded to the stud.

The attaching device includes a fastener strap engaged with the arm, for detachably attaching the arm of the attaching device onto the supporting object. The attaching device includes a lever pivotally attached to the arm, the fastener strap is engaged through the lever and includes a ring member attached to one end thereof, for detachably engaging with and attaching to the arm of the attaching device.

The arm includes a recess formed therein and defined between two walls for receiving the lever. The arm includes an orifice formed therein, and the lever includes an axle extended therefrom and rotatably engaged in the orifice of the arm, for pivotally attaching the lever to the arm.

The arm includes an opening formed therein and communicating with the orifice thereof for receiving the axle of the lever, and includes a finger extended into the opening thereof, for engaging with the axle of the lever, and for retaining the axle of the lever in the orifice of the arm.

The lever includes an enlarged head extended from the axle for engaging with the arm, and for retaining the axle of the lever to the arm. The lever includes a bar extended therein to form and define a passage therein, and for receiving the fastener strap therein.

The lever includes at least one swelling extended outwardly therefrom, for engaging with the arm, and for anchoring or positioning the lever to the arm. The arm includes at least one depression formed therein for selectively receiving the swelling of the lever. The arm includes a pad attached thereto for engaging with the supporting object.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 13 is a partial exploded view of the attaching device of the light device;

FIGS. 14, 15, 16 are enlarged partial perspective views of the attaching device of the light device; and FIG. 17 is a bottom perspective view of light member of the light device.

DETAILED DESCRIPTION OF THE PREFERRED EMBODIMENT

Figure 1:
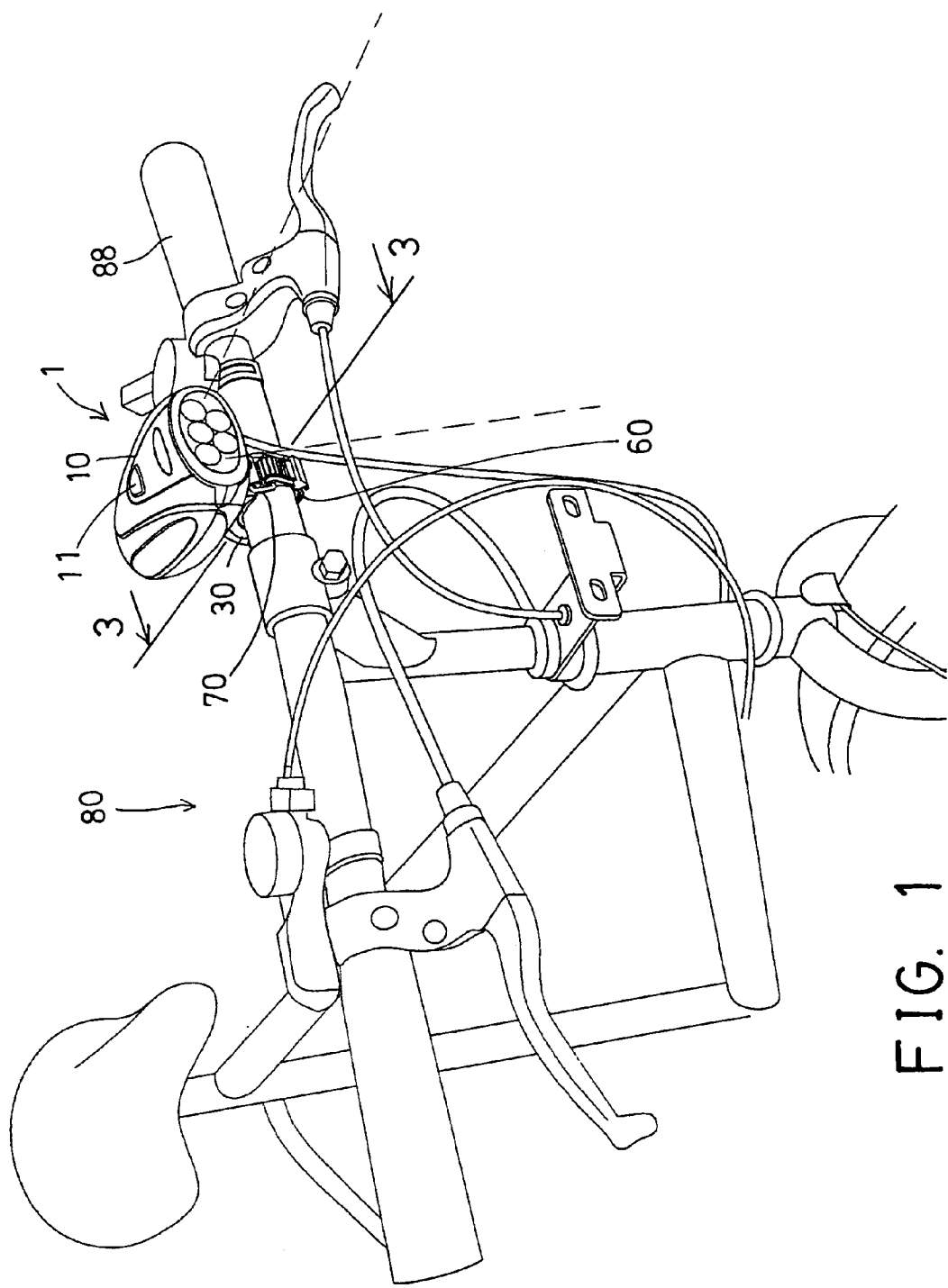
FIG. 1 is a perspective view illustrating an attachment of a light device in accordance with the present invention onto a handlebar of a bicycle.

Referring to the drawings, and initially to FIGS. 1–6, a light device 1 in accordance with the present invention comprises a light member 10 for detachably attaching or securing onto various supporting objects 80, such as handlebar 88 of the bicycles 80 with an attaching device 3, for selectively attaching to the bicycle 80 and used as a head light or a light facility (FIG. 1), or for selectively disengaging or detaching from the bicycle 80, and to be used as a separated flashlight device. The light member 10 includes a typical switch 11 for actuating or controlling the light elements 12 to selectively generate light.

The light member 10 also includes one or more typical batteries disposed therein (not shown), for energizing the light elements 12. It is preferable that the light member 10 includes a cavity 13, such as a non-circular cavity 13 formed therein, such as formed in the bottom portion thereof, and a stud 14 extended in the cavity 13 thereof, for coupling or attaching or securing to an anchoring member 20, as shown in FIGS. 3–4, 6–7 and 13, which may be used to selectively attach the light member 10 to the attaching device 3.

The anchoring member 20 includes a protrusion 21, such as a non-circular protrusion 21 extended therefrom (FIG. 13), for engaging into the corresponding non-circular cavity 13 of the light member 10, and for preventing the anchoring member 20 from being rotated relative to the light member 10, and includes a bore 22 formed therein for receiving the stud 14 of the light member 10, and for securing the anchoring member 20 to the light member 10 with such as fasteners 23, and includes an enlarged plate or flap 24 laterally extended out of the protrusion 21 and having a serrated surface or a number of teeth 25 extended therefrom.

Figure 6:
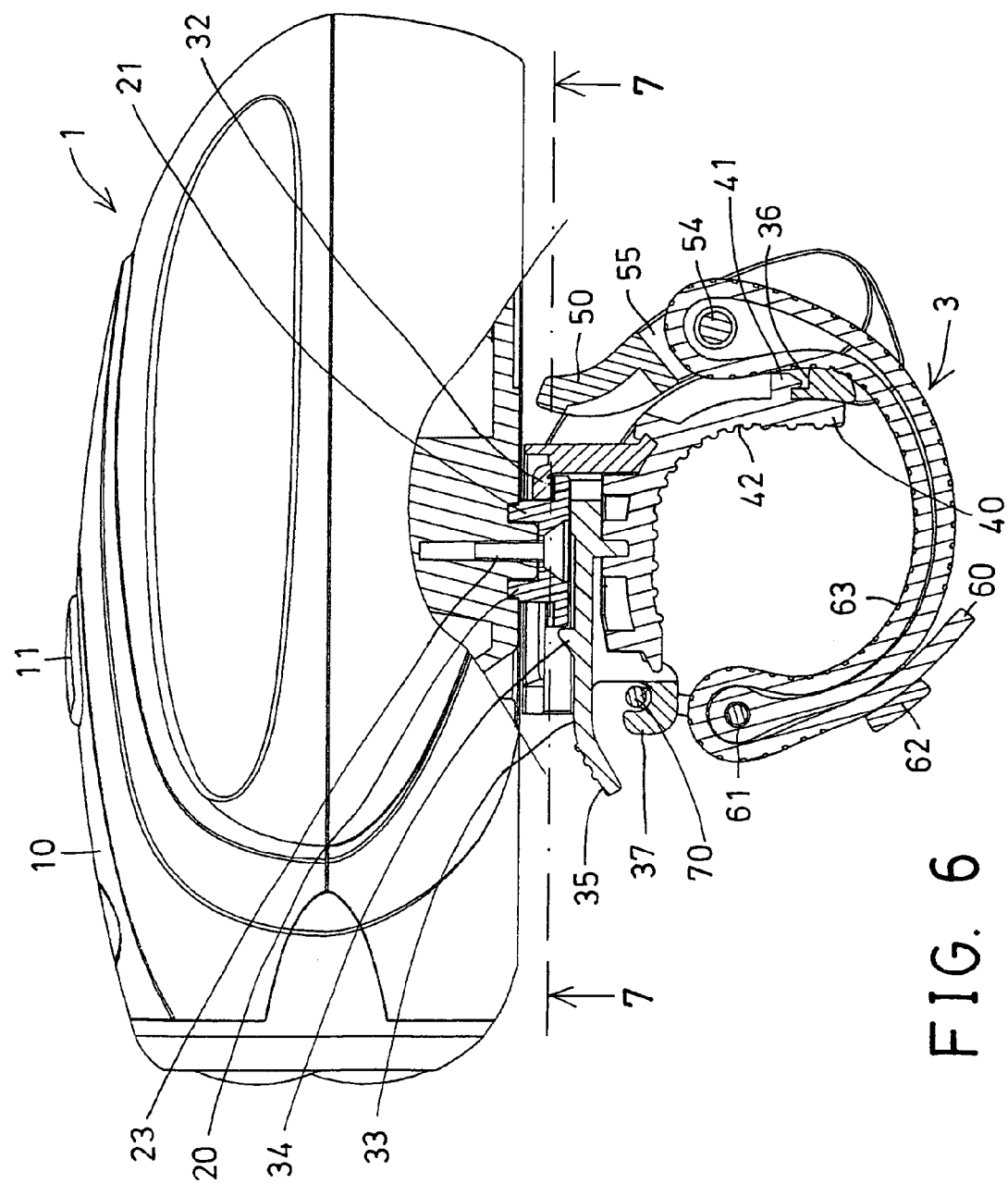
FIG. 6 is a side view of the light device, in which a portion of the light device has been cut off, for showing an inner structure of the light device.
Figure 7:
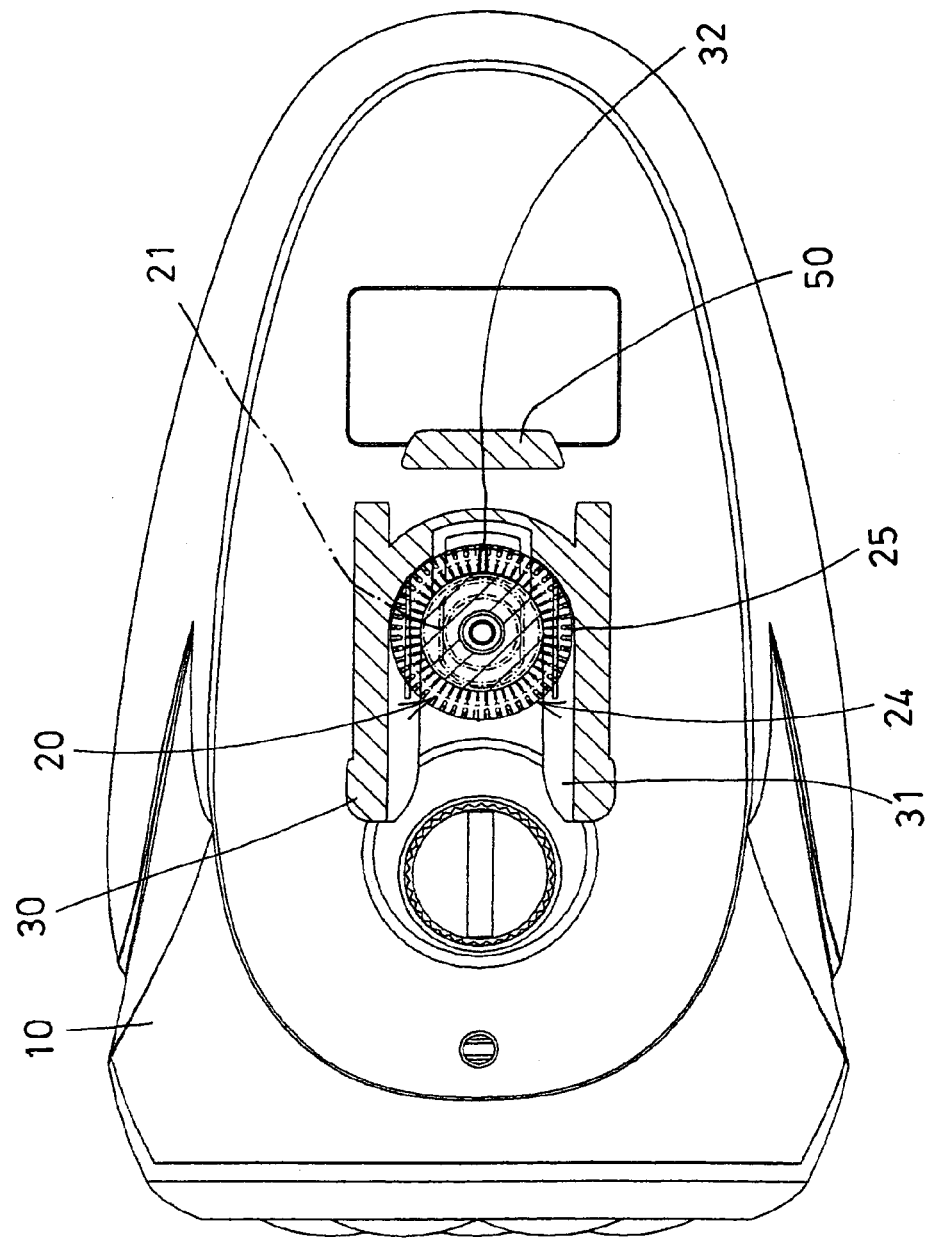
FIG. 7 is a partial cross sectional view taken along lines 7—7 of FIG. 6.
Figure 8:
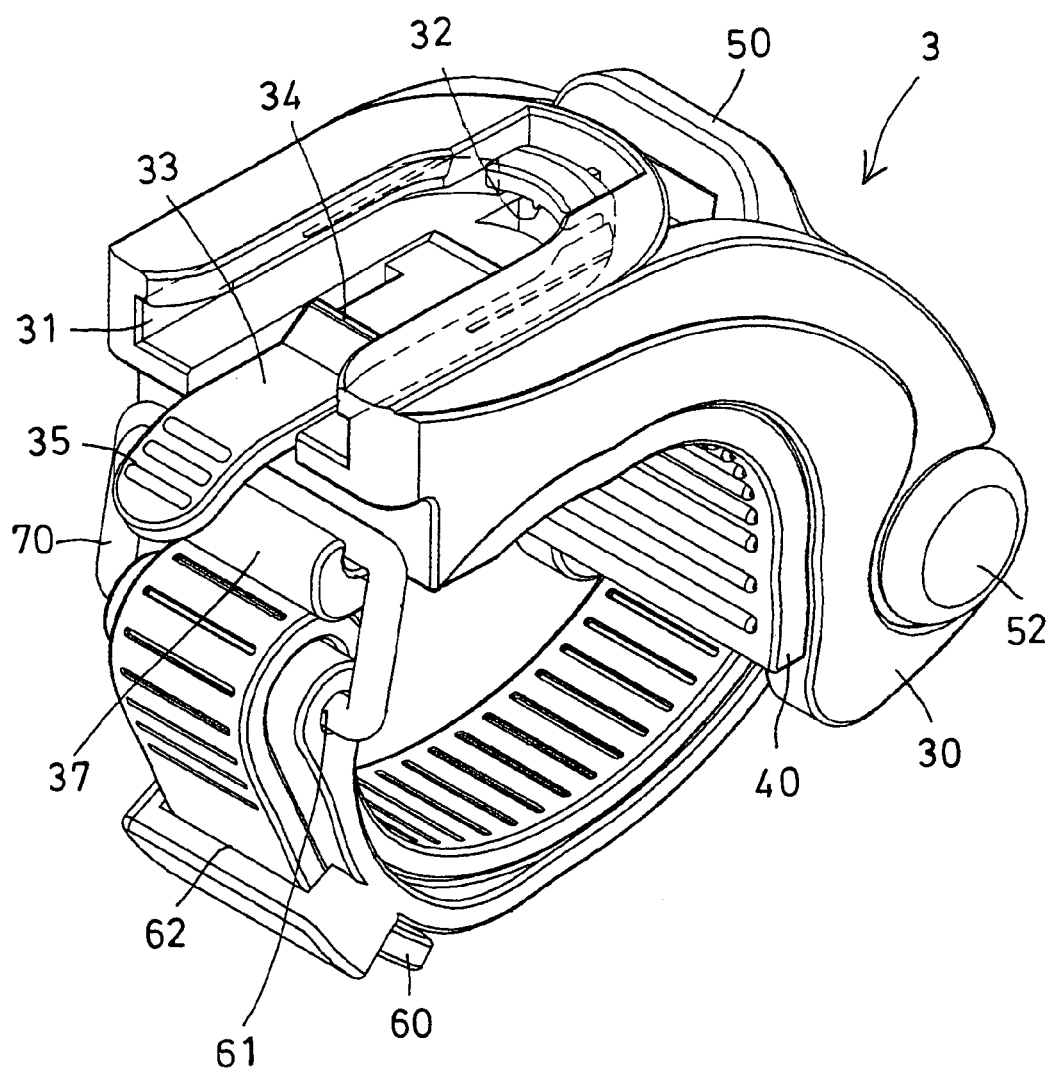
FIG. 8 is a perspective view illustrating an attaching device of the light device.

The attaching device 3 includes an arm 30 preferably having a curved structure for attaching or engaging onto curved objects 80, such as the handlebar 88 of the bicycle 80, best shown in FIGS. 3–4 and 11–12, and having a channel 31 formed therein (FIGS. 3–14) for slidably receiving the enlarged flap 24 of the anchoring member 20, and having a tongue 32 extended into the channel 31 thereof, for engaging with and for stably retaining the enlarged flap 24 of the anchoring member 20 in the channel 31 of the arm 30, best shown in FIG. 6. The teeth 25 of the flap 24 of the anchoring member 20 may be frictionally engaged with the arm 30 of the attaching device 3, for stably attaching or anchoring the anchoring member 20 to the arm 30 of the attaching device 3.

It is preferable that the arm 30 further includes a spring blade 33 formed or provided below the channel 31 thereof, and having a catch 34 extended into the channel 31 thereof, for engaging with the anchoring member 20, and for further stably retaining the anchoring member 20 in the channel 31 of the arm 30, also best shown in FIG. 6. The spring blade 33 includes a hand grip 35 formed or provided in the free end portion thereof, for being depressed or actuated by the user to selectively disengage the catch 34 from the anchoring member 20 (FIG. 4), and for allowing the anchoring member 20 and thus the light member 10 to be disengaged from the arm 30 of the attaching device 3.

The arm 30 includes one or more anchoring holes 36 formed therein, a pad 40, such as a soft or resilient pad 40 includes one or more pegs 41 extended therefrom, for engaging into the anchoring holes 36 of the arm 30, and for attaching or securing the pad 40 to the inner portion of the arm 30, and for softly engaging with the supporting objects 80 or the handlebars 88 of the bicycles 80, and for preventing the handlebars 88 of the bicycles 80 from being scratched or damaged. The pad 40 includes a serrated surface formed thereon or includes a number of teeth 42 extended therefrom, for frictionally engaging with the handlebars 88 of the bicycles 80, for example.

The arm 30 includes a hook 37 formed or provided therein, such as provided on one end thereof, for hooking or engaging with a loop or ring member 70, and includes an orifice 38 formed in the other end thereof, opposite to or located distal to the hook 37, for pivotally or rotatably attaching a lever 50 thereto. For example, the arm 30 includes a recess 301 formed therein and defined between two walls 303 (FIGS. 13, 14), and communicating with the orifice 38 thereof, for receiving the lever 50, and the lever 50 includes one or more, such as two axles 51 laterally extended outwardly therefrom for rotatably engaging into the orifice 38 of the arm 30, and thus for pivotally or rotatably attaching the lever 50 to the arm 30.

It is preferable that the arm 30 includes an opening 381 formed therein and communicating with the orifice 38 thereof, for receiving the axles 51 of the lever 50, and includes a spring finger 382 extended into the opening 381 or the orifice 38 thereof, for engaging with the axles 51 of the lever 50, and for further stably retaining the axles 51 of the lever 50 in the orifice 38 of the arm 30. The lever 50 includes an enlarged head 52 extended from each of the axles 51 for engaging with the arm 30, and for further stably retaining the axles 51 of the lever 50 to the arm 30.

The arm 30 further includes one or more depressions 39 formed therein, such as formed in the wall 303 thereof (FIG. 14), and the lever 50 includes one or more swellings 53 extended outwardly therefrom (FIGS. 9–10 and 13), for engaging with the depressions 39 of the arm 30, and for selectively retaining or positioning the lever 50 to the arm 30, at a closing or locking position (FIGS. 3–6). The lever 50 includes a bar 54 laterally extended therein for forming or defining a passage 55 therein, and for receiving a fastener strap 60 therein.

The fastener strap 60 includes a hole 61 formed in one end thereof for receiving or engaging with the ring member 70, and includes an eye 62 forming therein for receiving a folded end of the fastener strap 60 therein (FIGS. 3–6, 8 and 10). The fastener strap 60 is engageable through the passage 55 of the lever 50, and engageable onto the supporting objects 80 or the handlebars 88 of the bicycles 80, and includes a serrated surface or a number of teeth 63 extended therefrom, for frictionally engaging with the handlebars 88 of the bicycles 80.

Figure 9:
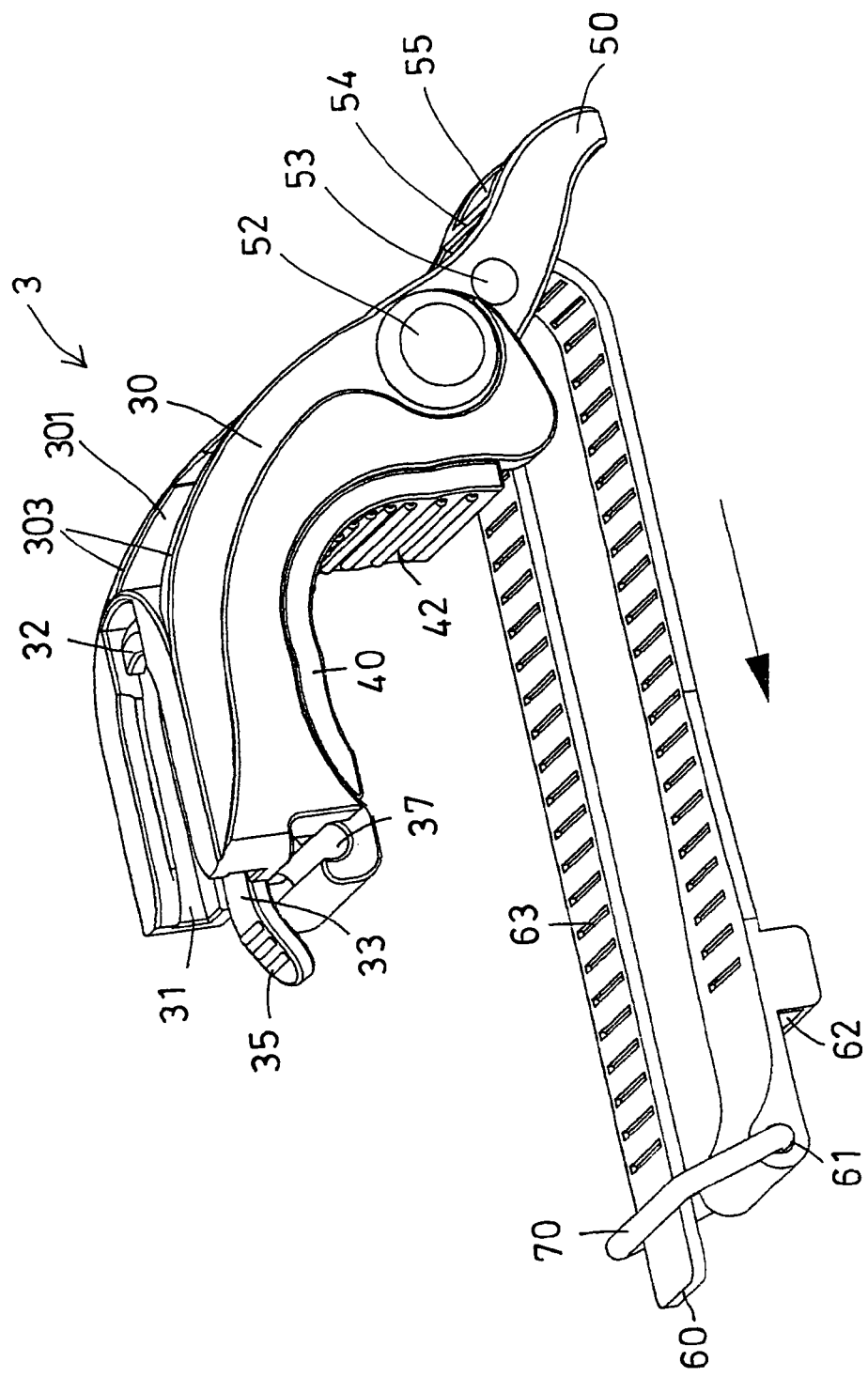
FIGS. 9, 10 are perspective views similar to FIG. 8, illustrating the operation of the attaching device of the light device.
Figure 11:
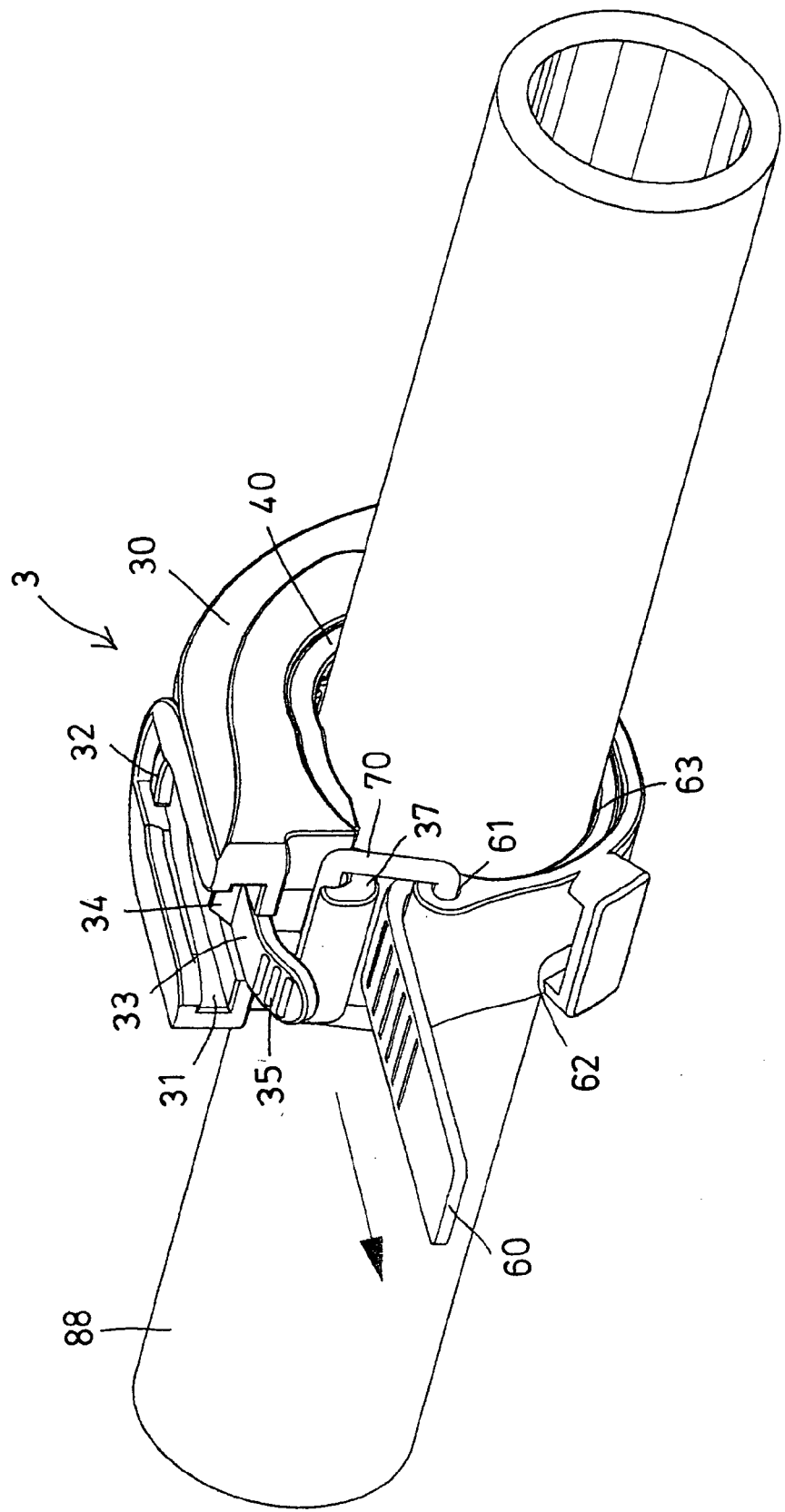
FIGS. 11, 12 are perspective views illustrating the attachment or securing of the attaching device of the light device to the handlebar of the bicycle.
Figure 12:
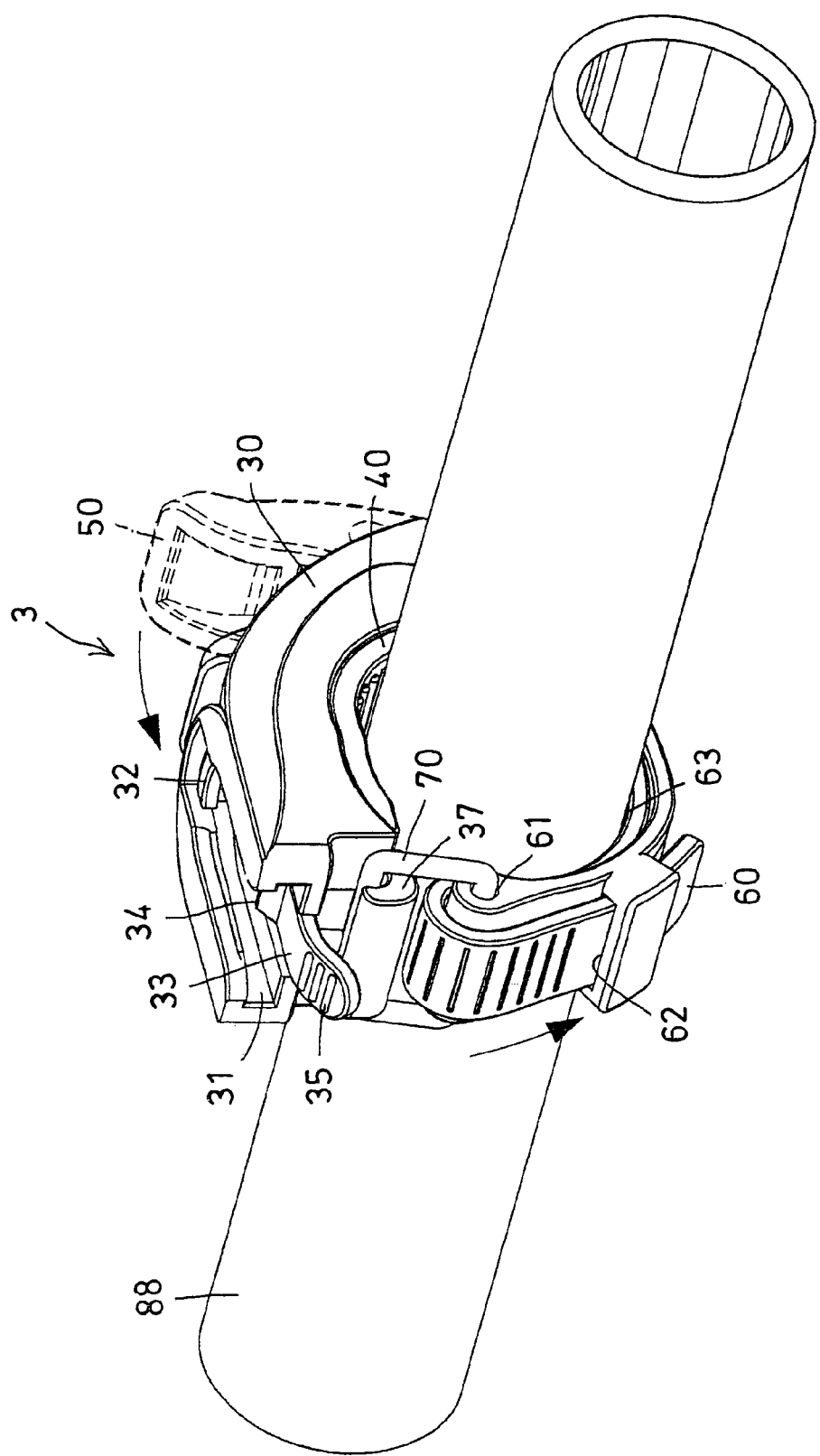

In operation, as shown in FIG. 9, the fastener strap 60 may first be engaged through the passage 55 of the lever 50, and bent and engaged through the ring member 70, and may be engaged onto the supporting objects 80 or the handlebars 88 of the bicycles 80 (FIG. 11). The ring member 70 may then be engaged with or onto the hook 37 of the arm 30, and the fastener strap 60 may then be pulled to tightly engaged onto the supporting objects 80 or the handlebars 88 of the bicycles 80, and may then be folded and engaged through the eye 62 thereof (FIG. 12). The lever 50 may then be rotated relative to the arm 30, to quickly couple or fasten or secure the attaching device 3 to the supporting objects 80 or the handlebars 88 of the bicycles 80.

Figure 10:
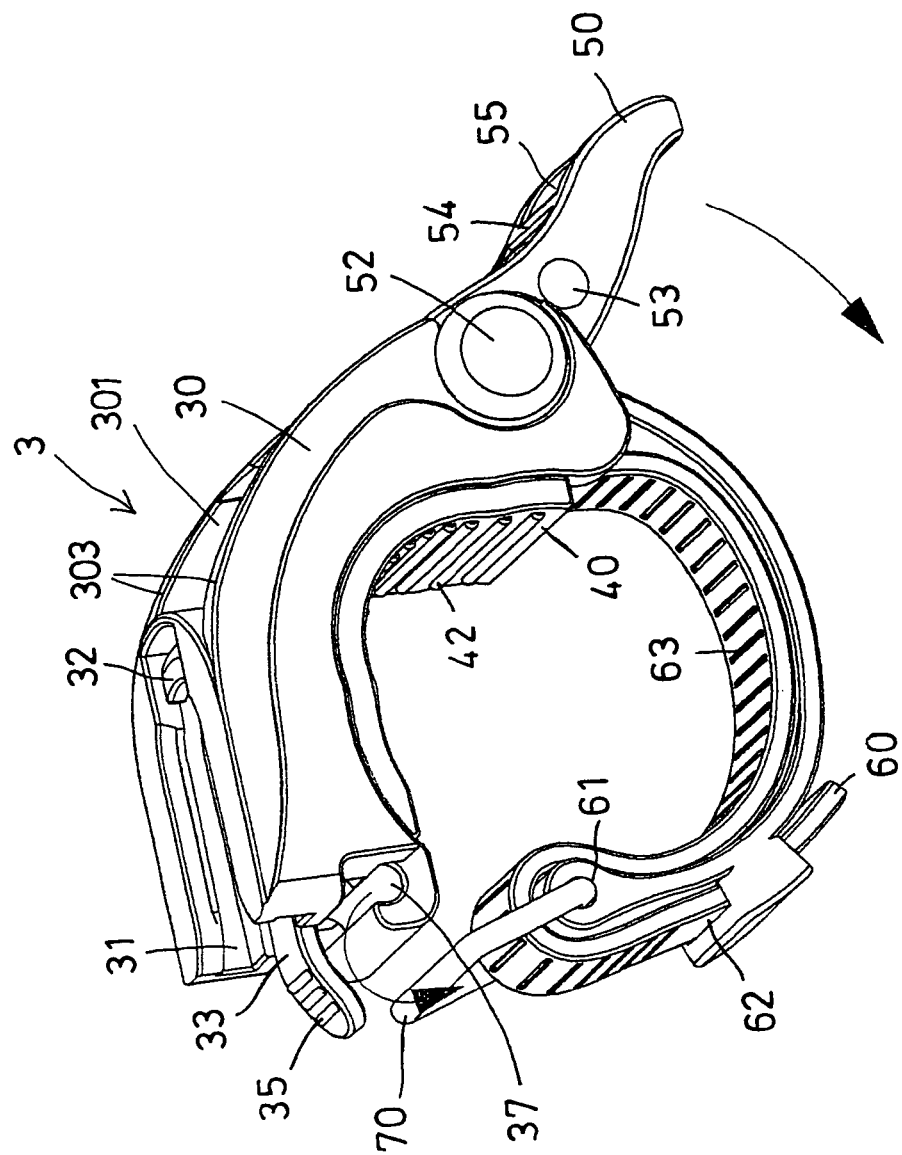

On the contrary, when it is required to remove or to disengage the attaching device 3 from the supporting objects 80 or the handlebars 88 of the bicycles 80, as shown in FIG. 10, it is only required to pull and rotate the lever 50 relative to or away from the arm 30, to release the fastener strap 60, and to allow the ring member 70 to be removed or disengaged from the hook 37 of the arm 30, and thus to allow the attaching device 3 to be removed or disengaged from the supporting objects 80 or the handlebars 88 of the bicycles 80.

Figure 2:
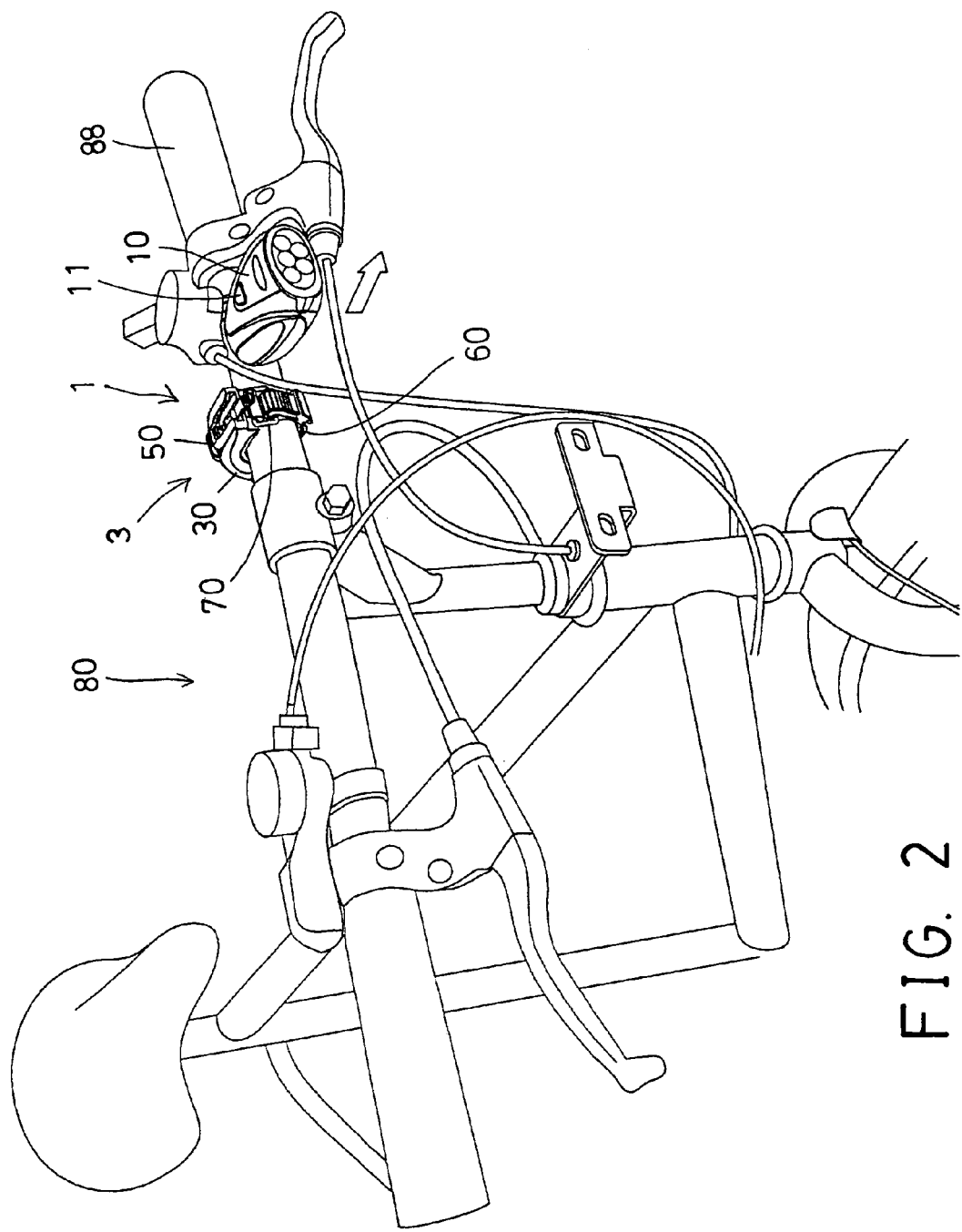
FIG. 2 is a perspective view similar to FIG. 1, illustrating the disengaging or detachment of the light device from the handlebar of the bicycle.
Figure 3:
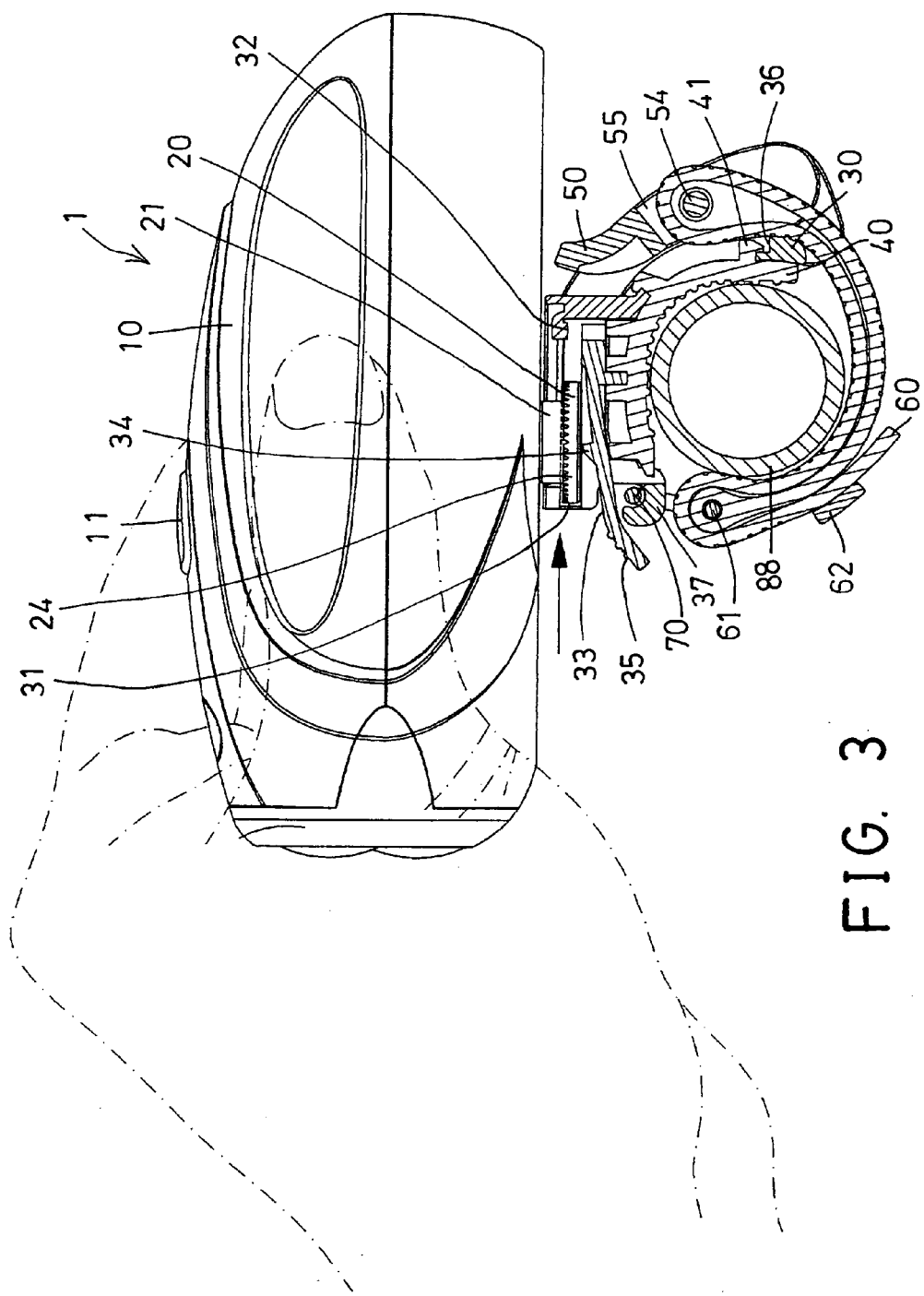
FIG. 3 is a partial cross sectional view taken along lines 3—3 of FIG. 1.
Figure 4:
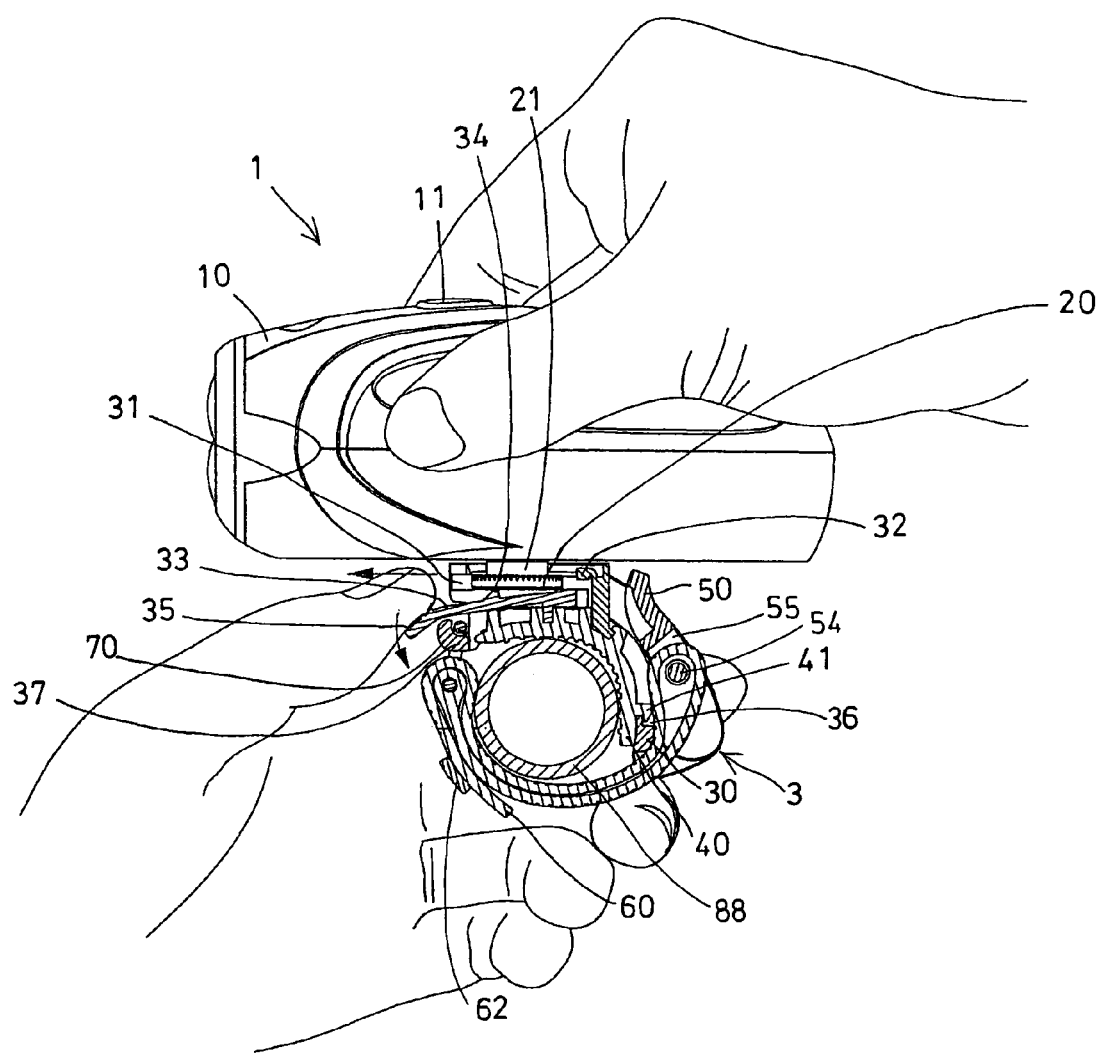
FIG. 4 is a partial cross sectional view similar to FIG. 3, illustrating the operation of the light device.
Figure 5:
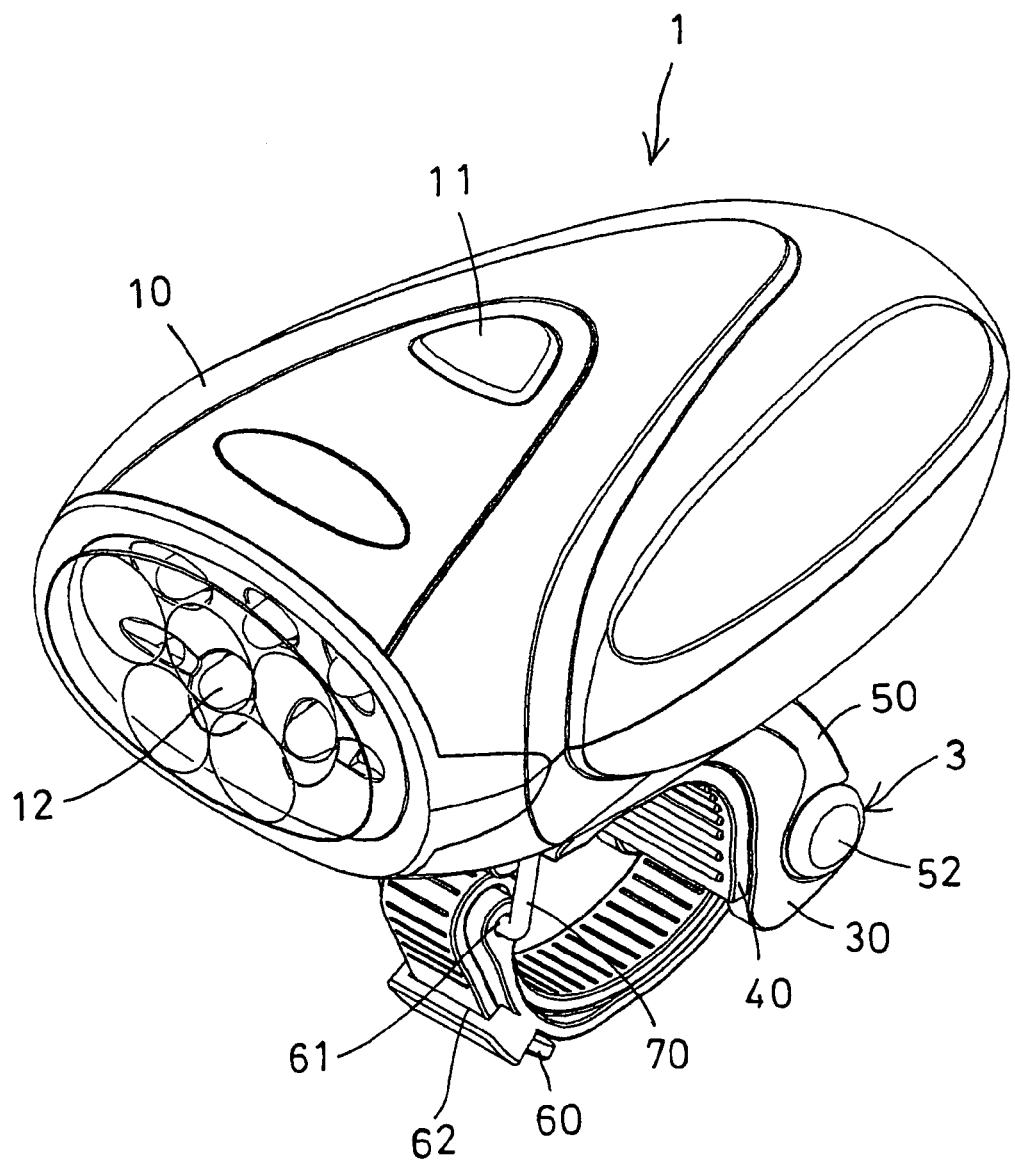
FIG. 5 is a perspective view of the light device.

In operation, as shown in FIGS. 1 and 2, the attaching device 3 may be attached to or secured onto the supporting objects 80 or the handlebars 88 of the bicycles 80 with the lever 50 and the fastener strap 60, and the light member 10 may be selectively attached to the attaching device 3 with the anchoring member 20, for being used as a head light or a light facility (FIG. 1), and may also be selectively disengaged or detached from the bicycle 80 (FIG. 2) for being used as a separated flashlight device. The anchoring member 20 may be acted as an anchoring means or device for selectively anchoring or securing or attaching the light member 10 to the supporting objects 80 or the handlebars 88 of the bicycles 80 with the attaching device 3.

The conventional light member 10 may not be selectively attached to the supporting objects 80 for being used as a head light or a light facility, and may not be selectively disengaged or detached from the supporting objects 80 for being used as a separated flashlight device.

Accordingly, the light device in accordance with the present invention includes a structure for easily and readily attaching to various supporting objects, such as bicycles, etc. when required, and for allowing the light device to be disengaged or detached from the bicycle, and to be used as a separated flashlight.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A light device comprising:
   an attaching device for attaching onto a supporting object, and said attaching device including an arm having a channel formed therein, said arm including a spring-biased catch extended into said channel of said arm,
   a light member selectively attached to said attaching device for being used as a light facility for the supporting object, and selectively disengaged from the supporting object for being used as a flashlight device, and
   means for selectively anchoring said light member to the supporting object with said attaching device, said anchoring means including an anchoring member having a flap extended therefrom, for engaging into said channel of said arm, and for detachably attaching to said arm of said attaching device, and
   said spring-biased catch of said arm being provided for engaging with and for retaining said flap of said anchoring member in said channel of said arm.

2. The light device as claimed in claim 1, wherein said arm includes a tongue extended into said channel thereof, for engaging with and for retaining said flap of said anchoring member in said channel of said arm.

3. The light device as claimed in claim 1, wherein said arm includes a spring blade having said catch extended therefrom and extended into said channel thereof, and having a hand grip for selectively disengaging said catch from said anchoring member.

4. The light device as claimed in claim 1, wherein said light member includes a cavity formed therein, and said anchoring member includes a protrusion extended therefrom for engaging into said cavity of said light member, and for securing to said light member.

5. The light device as claimed in claim 4, wherein said cavity of said light member includes a non-circular cross section, and said protrusion of said anchoring member includes a non-circular cross section for engaging said non-circular cavity of said light member, and for preventing said anchoring member from being rotated relative to said light member.

6. The light device as claimed in claim 4, wherein said light member includes a stud extended in said cavity thereof, and said anchoring member includes a bore formed therein for receiving said stud of said light member, and for securing said anchoring member to said light member with a fastener.

7. The light device as claimed in claim 1, wherein said attaching device includes an arm for attaching onto the supporting object, and a fastener strap engaged with said arm, for detachably attaching said arm of said attaching device onto the supporting object.

8. The light device as claimed in claim 7, wherein said attaching device includes a lever pivotally attached to said arm, said fastener strap is engaged through said lever and includes a ring member attached to one end thereof, for detachably engaging with and attaching to said arm of said attaching device.

9. The light device as claimed in claim 8, wherein said arm includes a recess formed therein and defined between two walls for receiving said lever.

10. A light device comprising:
    an attaching device including an arm for attaching onto a supporting object, and including a lever pivotally attached to said arm, a fastener strap engaged with said arm for detachably attaching said arm of said attaching device onto the supporting object, said fastener strap being engaged through said lever and including a ring member attached to one end thereof, for detachably engaging with and attaching to said arm of said attaching device, and a light member selectively attached to said attaching device for being used as a light facility for the supporting object, and selectively disengaged from the supporting object for being used as a flashlight device, and said arm including an orifice formed therein, and said lever including an axle extended therefrom and rotatably engaged in said orifice of said arm, for pivotally attaching said lever to said arm.

11. The light device as claimed in claim 10, wherein said arm includes an opening formed therein and communicating with said orifice thereof for receiving said axle of said lever, and includes a finger extended into said opening thereof, for engaging with said axle of said lever, and for retaining said axle of said lever in said orifice of said arm.

12. The light device as claimed in claim 10, wherein said lever includes an enlarged head extended from said axle for engaging with said arm, and for retaining said axle of said lever to said arm.

13. The light device as claimed in claim 8, wherein said lever includes a bar extended therein to form and define a passage therein, and for receiving said fastener strap therein.

14. A light device comprising:

an attaching device including an arm for attaching onto a supporting object, and including a lever pivotally attached to said arm, a fastener strap engaged with said arm for detachably attaching said arm of said attaching device onto the supporting object, said fastener strap being engaged through said lever and including a ring member attached to one end thereof, for detachably engaging with and attaching to said arm of said attaching device, and a light member selectively attached to said attaching device for being used as a light facility for the supporting object, and selectively disengaged from the supporting object for being used as a flashlight device, and said lever including at least one swelling extended outwardly therefrom, for engaging with said arm, and for retaining said lever to said arm.

15. The light device as claimed in claim 14, wherein said arm includes at least one depression formed therein for selectively receiving said at least one swelling of said lever.

16. The light device as claimed in claim 7, wherein said arm includes a pad attached thereto for engaging with the supporting object.

* * * * *